US 8,620,661 B2

(12) United States Patent
Ramstrum (10) Patent No.: US 8,620,661 B2
(45) Date of Patent: Dec. 31, 2013

(54) SYSTEM FOR CONTROLLING DIGITAL EFFECTS IN LIVE PERFORMANCES WITH VOCAL IMPROVISATION

(76) Inventor: Momilani Ramstrum, Bonita, CA (US)

( * ) Notice: Subject to any disclaimer, the term of this patent is extended or adjusted under 35 U.S.C. 154(b) by 181 days.

(21) Appl. No.: 13/037,210

(22) Filed: Feb. 28, 2011

(65) Prior Publication Data
US 2011/0218810 A1 Sep. 8, 2011

Related U.S. Application Data

(60) Provisional application No. 61/309,808, filed on Mar. 2, 2010.

(51) Int. Cl.
*G10L 13/00* (2006.01)
*G10L 13/06* (2013.01)
*G10H 1/00* (2006.01)
*G10H 1/02* (2006.01)
*G10H 7/00* (2006.01)
*G10H 3/00* (2006.01)
*G01P 3/00* (2006.01)
*H03G 3/00* (2006.01)

(52) U.S. Cl.
USPC ............ 704/258; 704/268; 704/278; 381/61; 84/600; 84/662; 84/645; 84/723; 84/615; 84/626

(58) Field of Classification Search
USPC ................................................. 704/268, 278
See application file for complete search history.

(56) References Cited

U.S. PATENT DOCUMENTS

| 2,264,746 A | * | 12/1941 | Ellwood | 335/154 |
| 4,635,516 A | * | 1/1987 | Giannini | 84/600 |
| 4,875,238 A | * | 10/1989 | Solomon et al. | 2/115 |
| 5,166,462 A | * | 11/1992 | Suzuki et al. | 84/600 |
| 5,166,463 A | * | 11/1992 | Weber | 84/600 |
| 5,338,891 A | * | 8/1994 | Masubuchi et al. | 84/600 |
| 5,670,732 A | * | 9/1997 | Utsumi et al. | 84/645 |
| 5,700,966 A | * | 12/1997 | LaMarra | 84/645 |
| 5,915,237 A | * | 6/1999 | Boss et al. | 704/270.1 |
| 6,030,290 A | * | 2/2000 | Powell | 463/36 |
| 6,128,004 A | * | 10/2000 | McDowall et al. | 345/158 |

(Continued)

FOREIGN PATENT DOCUMENTS

GB 2221557 * 2/1990
WO WO 2004066261 A2 * 8/2004

OTHER PUBLICATIONS

Electrolytic Tilt Sensors and Inclinometers: A Primer; Sep. 2004, Sensor Technology and Design, http://www.spectronsensors.com/articles/Sensors%20Sept%202004.pdf.*

(Continued)

*Primary Examiner* — Paras D Shah
*Assistant Examiner* — Anne Thomas-Homescu
(74) *Attorney, Agent, or Firm* — Robert Kansy; Mark Wisnosky (57) ABSTRACT

A system for controlling digital effects in live performances with vocal improvisation is described. The system features a controller that utilizes several switches attached to clothing that is worn by an artist during a live performance. The switches activate a digital vocal processor unit that provides a dual mode, multi-channel phrase looping capability wherein individual channels can be selected for recording and replay during the performance. This combination of features allows a sequence of digital audio and video effects to be controlled by the artist during a performance while maintaining the freedom of movement desired to enhance the performance.

11 Claims, 5 Drawing Sheets

(56) References Cited

U.S. PATENT DOCUMENTS

| | | | |
|---|---|---|---|
| 6,141,643 A * | 10/2000 | Harmon | 704/271 |
| 6,279,163 B1 * | 8/2001 | Hale et al. | 2/160 |
| 6,304,840 B1 * | 10/2001 | Vance et al. | 703/21 |
| 6,316,711 B2 * | 11/2001 | Matsuda et al. | 84/615 |
| 6,380,923 B1 * | 4/2002 | Fukumoto et al. | 345/156 |
| 6,420,640 B2 * | 7/2002 | Koch | 84/600 |
| 6,754,351 B1 * | 6/2004 | Tanji | 381/61 |
| 7,012,593 B2 | 3/2006 | Yoon | |
| 7,183,480 B2 * | 2/2007 | Nishitani et al. | 84/615 |
| 7,199,301 B2 * | 4/2007 | Prittwitz | 84/615 |
| 7,381,884 B1 * | 6/2008 | Atakhanian | 84/723 |
| 7,569,762 B2 * | 8/2009 | Baum et al. | 84/626 |
| 7,674,969 B2 * | 3/2010 | Xu et al. | 84/615 |
| 7,781,666 B2 * | 8/2010 | Nishitani et al. | 84/723 |
| 2003/0025721 A1 * | 2/2003 | Clapper et al. | 345/700 |
| 2004/0112204 A1 * | 6/2004 | Javelle | 84/645 |
| 2010/0207881 A1 * | 8/2010 | Miller | 345/158 |
| 2010/0217413 A1 * | 8/2010 | Seiler | 700/94 |
| 2011/0191674 A1 * | 8/2011 | Rawley et al. | 715/702 |

OTHER PUBLICATIONS

Momilani Ramstrum, Developing a MIDI Glove for Controlling PD in Live Performances with Vocal Improvisation, ICMC 2010, Stony Brook University, New York, Jun. 1, 2010.

* cited by examiner

SYSTEM FOR CONTROLLING DIGITAL EFFECTS IN LIVE PERFORMANCES WITH VOCAL IMPROVISATION

CROSS-REFERENCE TO RELATED APPLICATIONS

This application claims priority to Provisional application 61/309,808 filed 2 Mar. 2010 which is incorporated herein by reference in its entirety.

BACKGROUND OF THE INVENTION

1. Technical Field

The present invention relates to an electronic system for controlling the application of digital signal processing techniques by a vocal artist to prerecorded and live vocalizations in a live performance setting.

2. Related Background Art

Digital signal processing (DSP) techniques have been developed over the past few decades that allow artists unprecedented flexibility in generating electronic audio signals as well as modifying and enhancing audio signals from diverse sources, both live and recorded. Previously, the hardware and software needed to accomplish such processing required bulky professional equipment and specialized training and was suitable for use in fixed installations in, for example, large recording studios. The increased performance of compact portable equipment such as personal computers and professional sound equipment and the development of easy-to-use, graphically-based computer programs for generating and modifying electrical signals has made it possible for artists themselves to program sophisticated digital effects on equipment that is portable and easy to set up and use in performance. For example, instrumentalists routinely employ completely electronic keyboard instruments that can be programmed to produce an enormous variety of custom sounds, as well as special effects triggered by keyboards and numerous special-purpose foot pedals in live performances that control special purpose DSP modules that manipulate the electronic digital waveforms acquired directly or indirectly from their musical instruments. The location of the foot pedals largely constrains the on-stage location and movement of the artist. Although the effects are routinely changed throughout a performance, it is unusual for multiple effects to be rapidly sequenced during the performance of a single piece of music.

The same range of effects is, of course, available to vocalists wherein the electrical signal is the digitized version of their utterances. If anything, the range and flexibility of the effects is more important to vocalists than it is to instrumentalists, in that it profoundly influences the range and complexity of the performance. Although well known effects such as reverb, filtering and compression have been employed for years, recent developments including vocoders, pitch correction, phrase looping and harmonizing have significantly expanded the repertoire. Several commercial vocal processors exist, but all are controlled using the footswitches and keyboards or keypads used by instrumentalists which hinder artistic expression through dance, gestures and general freedom of movement. Additionally, and related to the simplicity of the controlling interface, the number and flexibility of the effects provided are both limited. For example, the phrase looping effect usually comprises a single channel, so it does not provide for real-time editing (e.g., deletion or overwriting) of elements of the recorded phrase.

Thus, it is desirable to obtain a wider range of more flexible vocal effects that can be controlled during a live performance by a complex interface that is both easy to use and allows complete freedom of movement in order to incorporate gestures and movement into the performance.

DISCLOSURE OF THE INVENTION

A system for controlling digital effects in live performances with vocal improvisation is described. The system features a complex controller that in one embodiment utilizes several electronic switches attached to one or more items of apparel that are worn by an artist during a live performance. The switches are activated by actuators that are also attached to the items of apparel. Furthermore, the switches are connected to a digital vocal processor unit that provides a rich repertoire of digital effects using a miniature, battery-operated wireless data communications unit. This combination of features allows a complex sequence of digital effects to be controlled by the artist during a performance while maintaining the freedom of movement desired to enhance the performance.

In one particular embodiment, the electronic switches are magnetically activated switches attached to a glove and connected to a miniature battery-operated wireless data communications unit that communicates with a complementary communications unit attached to a portable laptop personal computer that executes the digital effects. One magnet that activates a subset of the switches is attached to the switch-bearing glove, while a second magnet for activating the remaining switches is attached to a second glove worn on the opposite hand. In the extant embodiment, the digital effects executed by the personal computer provide a multi-channel phrase looping capability wherein individual channels can be selected for re-recording and selected banks of channels can be deleted during the performance.

DETAILED DESCRIPTION

An embodiment of the present invention is a system for controlling digital effects in live performances with vocal improvisation comprising a digital effects controller and a digital vocal processor unit. In one embodiment, the digital effects controller is realized using a pair of gloves containing a plurality of magnetically actuated electronic switches and permanent magnets that activate the switches. Switch locations are selected on the basis of aesthetics of movement desired for a particular performance, ease of access, and avoidance of accidental switching. In one embodiment, switches are separated into two groups controlling primary and secondary events. One group of switches for primary events is positioned for easy access and triggers events which, if accidently triggered, are not critical to the continuity of the performance and are easily absorbed into the performance as an aspect of improvisation. These are events that might be rapidly triggered sequentially during the performance or for which relatively covert triggering with minimal motion is desired by the performer. A second group of switches triggers secondary events that, if accidently triggered, are potentially detrimental to the performance, are more difficult to absorb into the performance as improvisation, or which are typically triggered only once during a performance. Exemplary primary events would be changing volume, changing pitch, and changing phrase length. Exemplary secondary events include memory clearing, muting, and reset of the digital processor.

Figure 1:
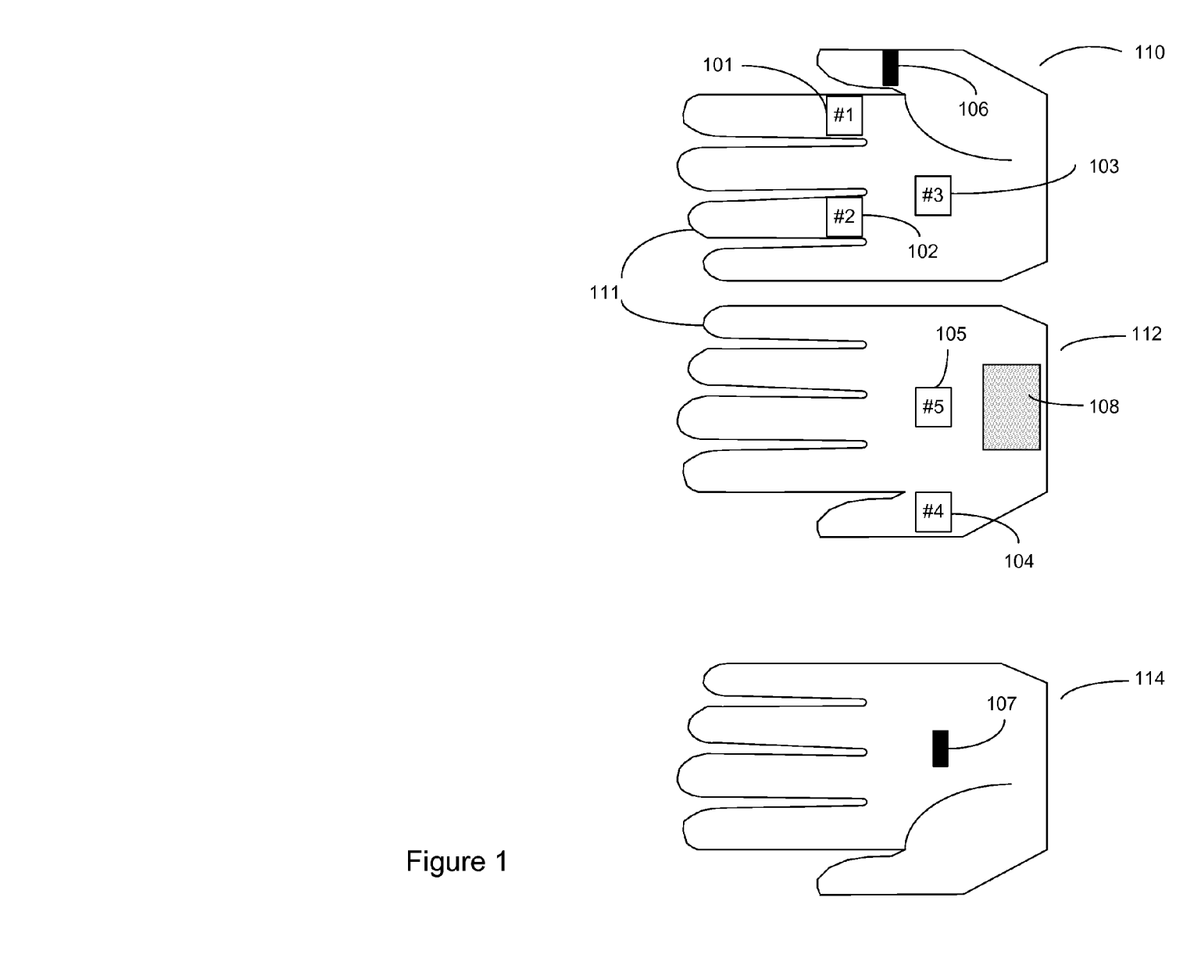
FIG. 1 shows the locations of the magnetic switches and actuating magnets in one embodiment.

In a preferred embodiment shown in FIG. 1, five switches 101-105 are all attached to the front side 110 of the right-hand glove 111 at the index finger 101, the ring finger 102 and the palm 103, and on the back side of the glove 112 at the back of the thumb 104 and the back of the hand 105.

Two activating magnets 106, 107 are attached: one to the right-hand glove at the thumb 106 to activate the index 101 and ring finger 102 switches, and the other to the palm 107 of the left-hand glove 114 to activate the palm 103 switch and those mounted on the back of the right-hand glove 104, 105. These switch locations were developed experimentally and are spaced far enough apart to avoid accidentally activating a neighboring switch while activating primary effects using 101-103, and to avoid unintended activation of 104, 105 which control secondary block and global effects, as will be described below. Finger mounted switches 101, 102 and the thumb mounted magnet 106 are mounted near the base of their respective digits to allow all finger tips to remain free for other artistic purposes. In another embodiment, the fingertips of the gloves can be removed for improved tactile sensitivity. Switches 101-105 are electronically connected to a battery-operated wireless data communications module 108 mounted on the back side 112 of the right hand glove 111.

Figure 2:
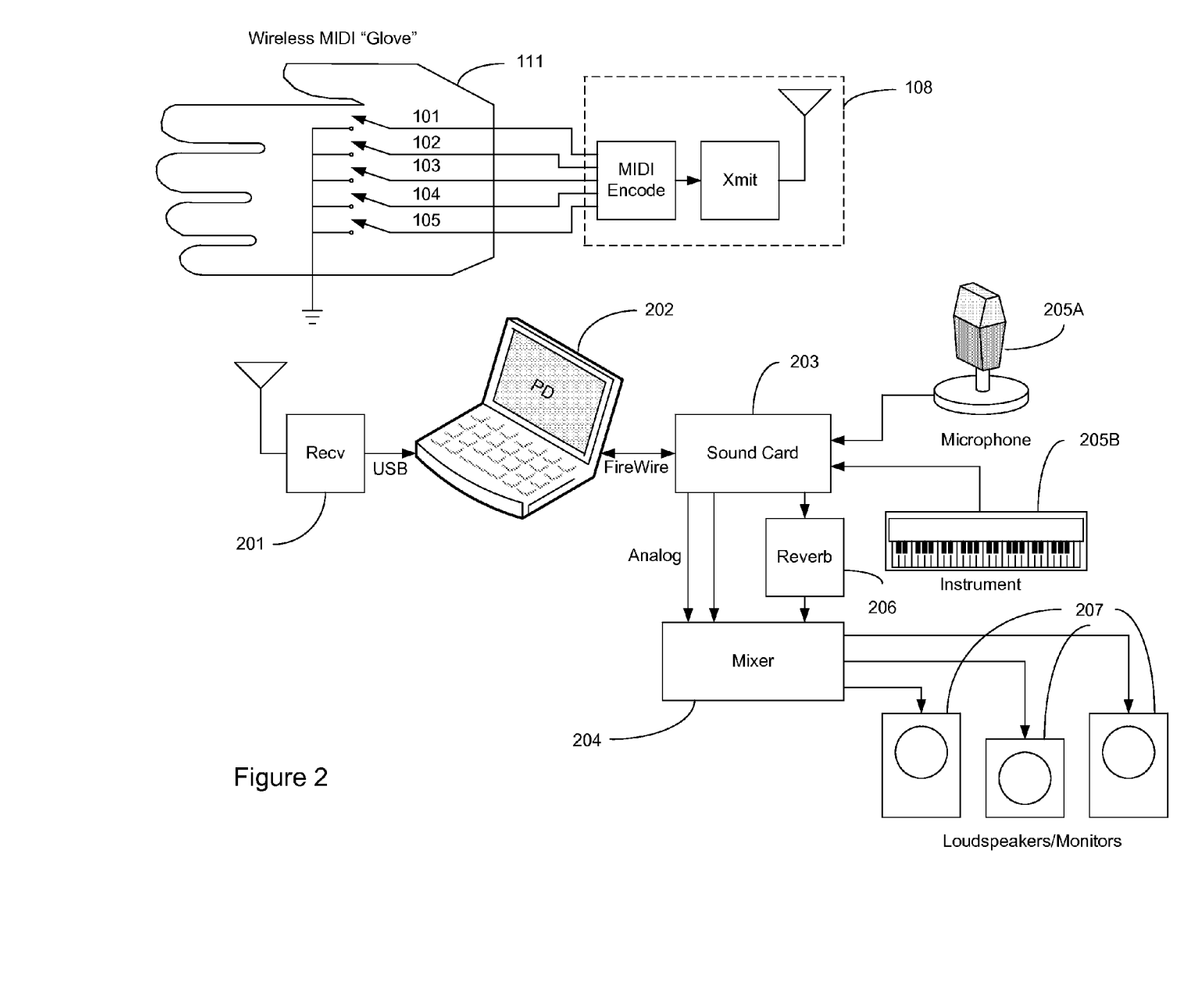
FIG. 2 is a block diagram of a digital effects control system interfaced to an exemplary sound system.

FIG. 2 is a block diagram showing the key elements of the invention connected to the key elements of a typical sound system. Switches 101-105 are connected to digital input terminals of a battery-operated wireless data communications module 108 such as a wireless MIDI unit manufactured by Eroktronix Corporation sold under the trademark MidiTron™, wherein the switch closures are encoded as Musical Instrument Digital Interface (MIDI) commands and transmitted as radio frequency (RF) signals. The wireless signals are received by a complementary RF receiver 201 and the demodulated MIDI codes are applied through a conventional USB (universal serial bus) port to a portable personal computer 202 which decodes the MIDI commands and applies them to the control of the signal processing software running thereon. In one embodiment the command interface and signal processing tasks are accomplished using a graphical programming interface such as Pure Data (PD) which readily accepts and decodes the MIDI commands from the controller. Analog audio signals from the artist's vocal performance are obtained from a microphone 205A and applied to sound card 203 such as produced by RME of Haimhausen, Germany, and sold under the trade name FIREFACE 400, wherein the analog audio signals are converted to digital format and provided to the personal computer 202 by a high-speed digital interconnection, such as a FireWire™ connection. In another embodiment, analog signals from a second source, such as a musical instrument 205B, are also applied to the sound card and are similarly digitized. Such musical instrument inputs might be useful if the digital vocal processor unit were programmed to provide a vocoder function, for example. Digital signals from the personal computer 202 are similarly provided to the sound card 203 wherein they are converted to analog format and applied to a sound mixer 204 such as manufactured by Mackie and sold under the trade name 1202-VLZ3, and subsequently through the house sound system to loudspeakers and monitors 207. A copy of the analog microphone 205 signal is also applied from the sound card 203 to a reverb unit 206 such as manufactured by Lexicon™ and sold under the trade name MX200 and subsequently to house sound through the mixer 204.

Figure 3:
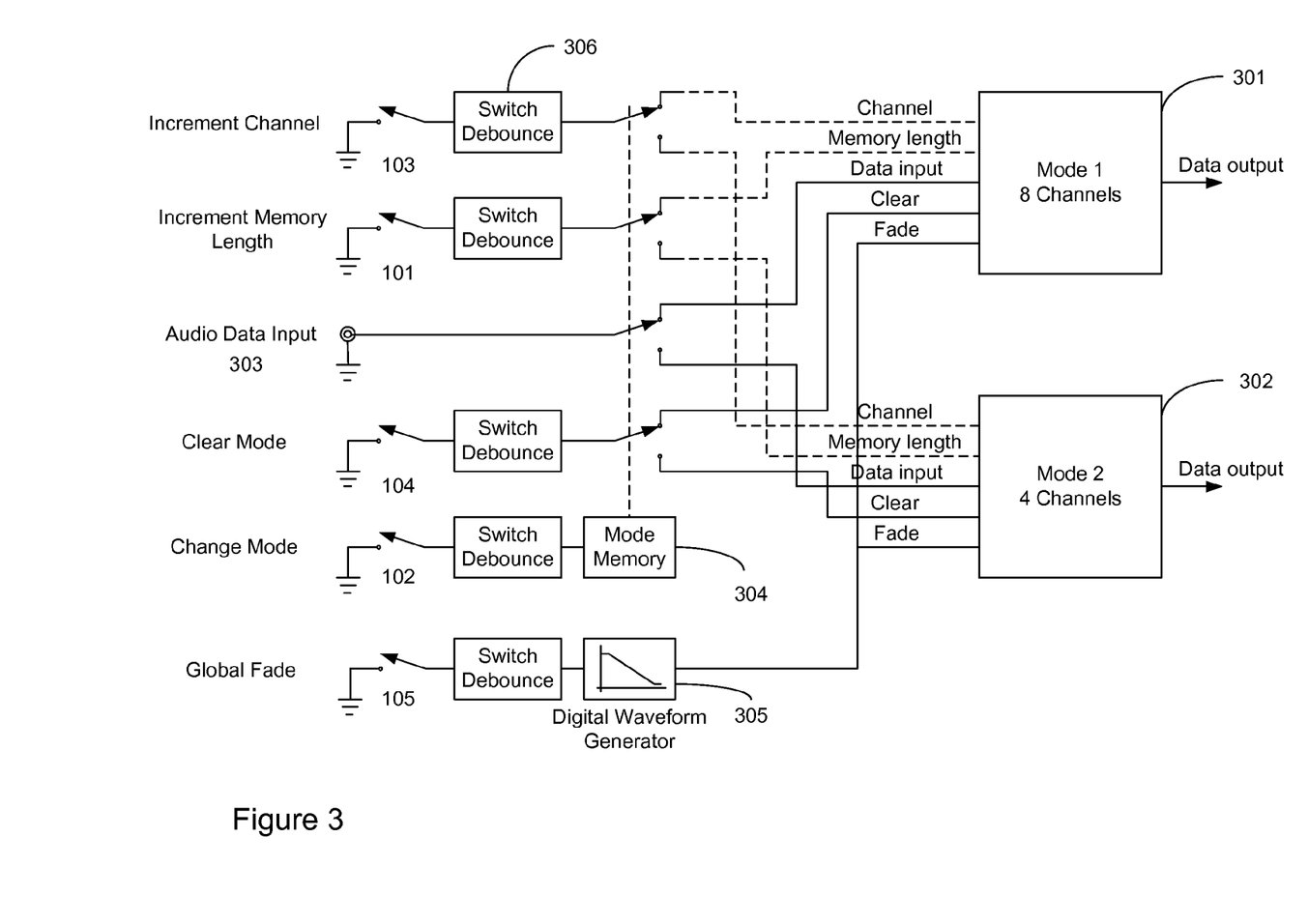
FIG. 3 shows a block diagram of the phrase loop controller implemented in the digital effects control system.

FIG. 3 is a block diagram showing the key functional blocks of the digital vocal processor as interconnected to the switches in the digital effects controller and the digital audio stream from the sound card 203. In this particular embodiment, the PD code running on the personal computer 202 implements a dual mode phrase looping system having a total of 12 memory channels. Mode 1 301 includes 8 memory channels with memory lengths of from 1 second to 5 seconds in 1 second increments. Mode 2 302 includes 4 memory channels also with memory lengths from 1 second to 5 seconds independent of Mode 1. Activation of primary index finger switch 101 increments the memory channel length of the selected mode. Activation of the primary palm switch 103 increments the memory channel in the selected mode and initiates recording. Activation of the secondary back side thumb switch 104 instantaneously clears all of the memory channels in the selected mode. Activation of the primary ring finger switch 102 changes modes by toggling the state of mode memory 304, which also controls the mode to which the digital input data 303 is applied. Activation of the secondary back hand switch 105 triggers a global fade-out of both modes by triggering digital waveform generator 305. Digital switch debouncing 306 was found to be necessary to apply to each of the switches 101-105 to avoid multiple triggering in normal operation of the controller. The digital output from each mode is provided to the sound card 203 which converts each to analog format and provides each on a separate connection to the mixer 204.

Figure 4:
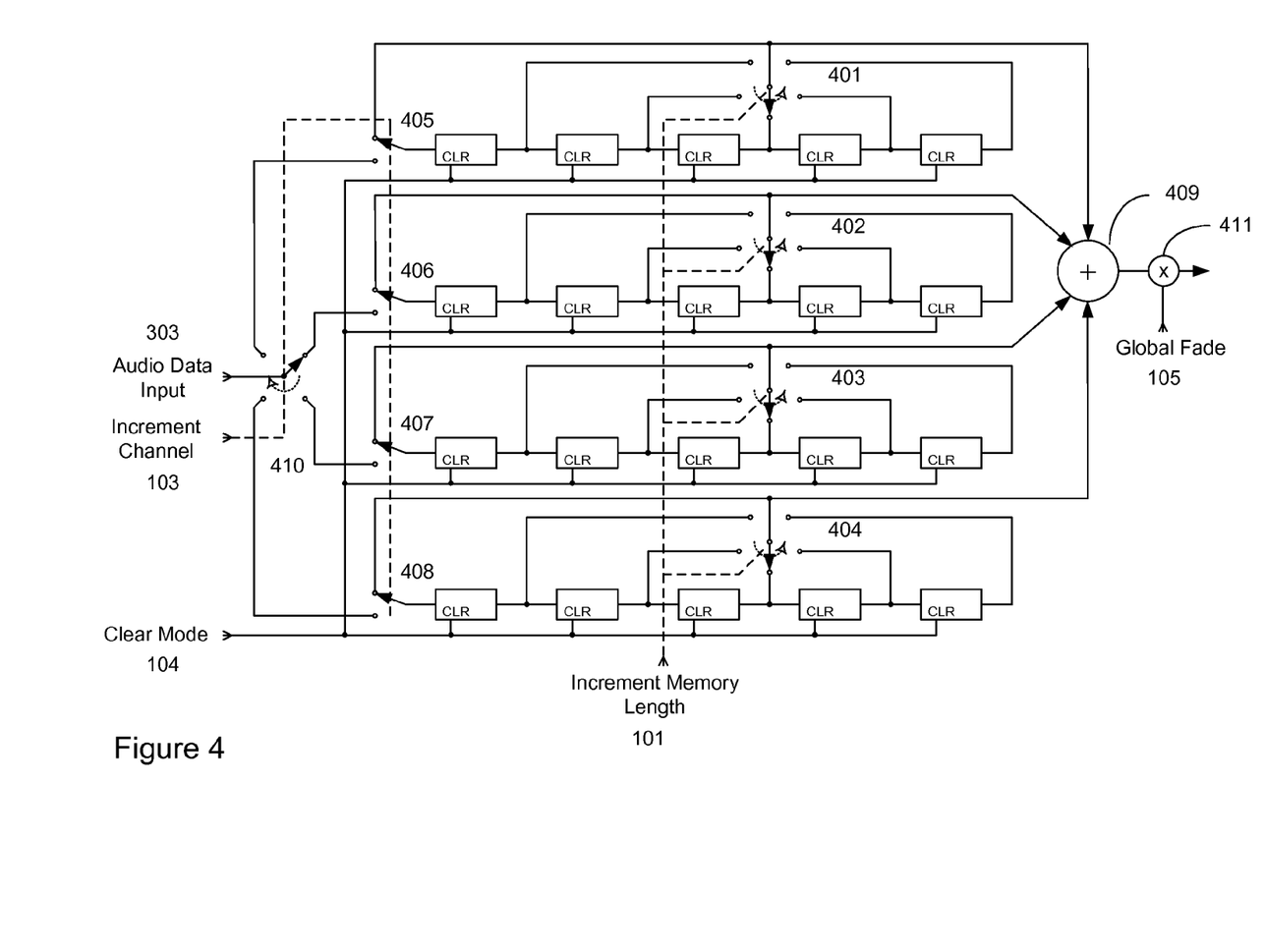
FIG. 4 is a detailed block diagram of the Mode 1 phrase loop processor.

FIG. 4 is a functional block diagram of the Mode 2 processor (302 in FIG. 3) showing the key digital elements. Each channel comprises a plurality of memory blocks, each block providing an interval of memory. Memory length is incremented through index finger switch 101 which commutates switches 401-404. The selected channel output is fed back to the channel input 405-408 for looping and is fed forward to an accumulator 409 for formation of the composite phrase looping signal for Mode 2. Channel selection is accomplished by commutating 4-position switch 410, which is triggered by the palm switch 103. In the preferred embodiment each channel comprises five memory blocks, each providing 1 second of memory. Consequently, switches 401-404 are 5-position switches. Digital audio data is provided from the sound card 203. Activation of the back thumb switch 104 triggers a parallel CLEAR of all memory locations, effectively erasing all stored data instantaneously. Activation of the back hand switch 105 applies the digital fade signal from generator 305 to multiplier 411.

Figure 5:
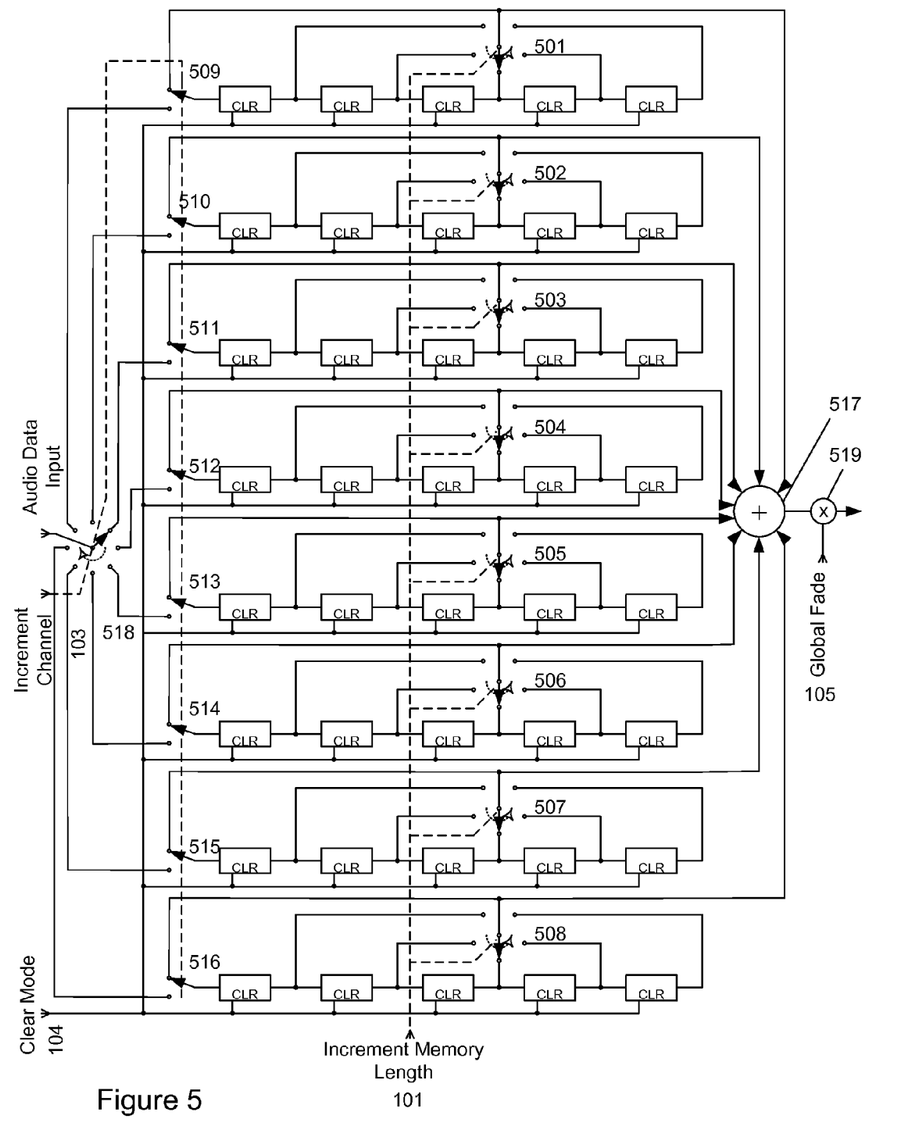
FIG. 5 is a detailed block diagram of the Mode 2 phrase loop processor.

FIG. 5 is a functional block diagram of the Mode 1 processor showing the key digital elements. The individual channel configurations are identical to the Mode 2 processor. Memory length is incremented through index finger switch 101 which commutates 5-position switches 501-508. The selected channel output is fed back to the channel input 509-516 for looping and is fed forward to an accumulator 517 for formation of the composite phrase looping signal for Mode 1. Channel selection is accomplished by commutating 8-position switch 518, which is triggered by the palm switch 103. Digital audio data is provided from the sound card 203. Activation of the back thumb switch 104 triggers a parallel CLEAR of all memory locations, effectively erasing all stored data instantaneously.

Activation of the back hand switch 105 applies the digital fade signal from generator 305 to multiplier 519.

As will be understood by one skilled in the art, the digital functional elements shown in FIGS. 3, 4 and 5 are implemented in software and, consequently, are easily modified or enhanced. The preferred embodiment described above which includes the configuration of the digital effects controller, the mapping of the control functions onto the controller configuration, and the programmed configuration of the vocal effects processor, is one of a large number of alternative embodiments that provide a range of vocal effects and a range of potential gestures that control them. Consequently, one feature of the invention is that the palette of control gestures and the range of vocal effects that they control can both be readily customized for a particular artist or even for a particular performance.

As will be further understood by one skilled in the art, alternative switch mechanisms, including mechanical switches, switches controlled by capacitance or pressure sensors, and even multi-bit switches that enable more complex control features are consistent with the scope of the invention.

A further embodiment of the invention includes the ability to set arbitrary memory lengths by, for example, measuring the time between two successive actuations of the palm switch 103.

Another embodiment of the invention includes tactile feedback of switch actuations to provide the artist with real time feedback on the operations performed. Such feedback can be supplied using various electromechanical devices embedded within the gloves and preferably a bidirectional wireless communication unit so that the feedback signals are generated by successful operations within the digital vocal processor.

Yet another embodiment incorporates the capability for other signal processing operations such as transposition, pitch correction, and harmonizing within the digital vocal processor.

Another embodiment of the invention incorporates the capability to trigger digital images and video signals using the controller, in addition to the vocal signal processing operations.

SUMMARY

A system for controlling digital effects in live performances with vocal improvisation is described. The system features a complex controller that in one embodiment utilizes several magnetically activated electronic switches attached to a glove that is worn by an artist during a live performance. The switches are activated by a permanent magnet that is also attached to the switch bearing glove and a second magnet attached to a glove worn on the opposite hand. Furthermore, the switches are wirelessly connected by a miniature, battery-operated wireless data communications unit to a digital vocal processor unit that provides a dual mode, multi-channel phrase looping capability wherein individual channels can be selected for re-recording and selected banks of channels can be deleted during the performance. This combination of features allows a complex sequence of digital effects to be controlled by the artist during a performance while maintaining the freedom of movement desired to enhance the performance.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

What is claimed is:

1. A system for controlling digital effects in live performances with vocal improvisation comprising:
   a) digital input signals derived from vocal or instrumental sources,
   b) a digital effects controller comprising a plurality of switches and related actuators attached to one or more items of apparel,
   c) signal transmitting means attached to said items of apparel for wirelessly communicating the state of said switches,
   d) signal receiving means for receiving the wirelessly communicated state of said switches,
   e) signal processing means operatively connected to said receiving means for applying predetermined signal processing algorithms to said digital input signals according to preprogrammed instructions controlled by the state of the said switches
   wherein the predetermined signal processing algorithms perform the function of a dual mode, 12-channel phrase loop system, said dual mode, 12-channel phrase loop system comprising a plurality of memory channels each having a memory length, an input for audio data and an output for audio data, the memory channels separated into two modes, wherein the two mode comprises first mode comprising eight channels and a second mode comprising four channels, and wherein activation of each of the plurality of switches causes a respective action associated with the switch of:
   a) selecting the mode,
   b) selecting a memory location,
   c) storing the audio input as audio data in a memory location,
   e) outputting the stored audio data, and
   f) clearing the audio data from the memory location.

2. A digital effects control system as in claim 1 wherein the switches are magnetic switches and the related actuators are permanent magnets.

3. A digital effects control system as in claim 1 wherein the items of apparel are gloves.

4. A digital effects control system as in claim 1 further comprising primary signal processing comprised of at least one selected from changing volume when outputting stored audio data, changing pitch when outputting stored audio data, and changing the memory length and further comprising second signal processing comprised of at least one selected from clearing memory, muting of outputting stored audio data, and reset of the digital effects control system, wherein the locations of the actuators and switches that control primary signal processing algorithms allow execution using one of the gloves, and the locations of the actuators and switches that control secondary signal processing algorithms require the coordinated use of both gloves.

5. A digital effects controller as in claim 1 wherein the switches are conventional mechanical switches.

6. A digital effects controller as in claim 1 wherein the switches are activated by capacitance sensors.

7. A digital effects controller as in claim 1 wherein the switches are activated by pressure sensors.

8. A digital effects controller as in claim 1 wherein the switches are capable of presenting multiple electronic states to the signal processing means.

9. A digital effects controller as in claim 1 wherein the switches include means of providing tactile feedback of switch actuation.

10. A digital effects control system as in claim 1 wherein the predetermined signal processing algorithms perform additional functions selected from: transposition, pitch correction, and harmonizing within the digital vocal processor.

11. A digital effects control system as in claim 1 wherein the predetermined signal processing algorithms perform additional functions selected from: triggering digital images and video signals.

* * * * *